PATENTED MAR. 27, 1834.
S. LEONARD.
THRESHING MACHINE.
8112X
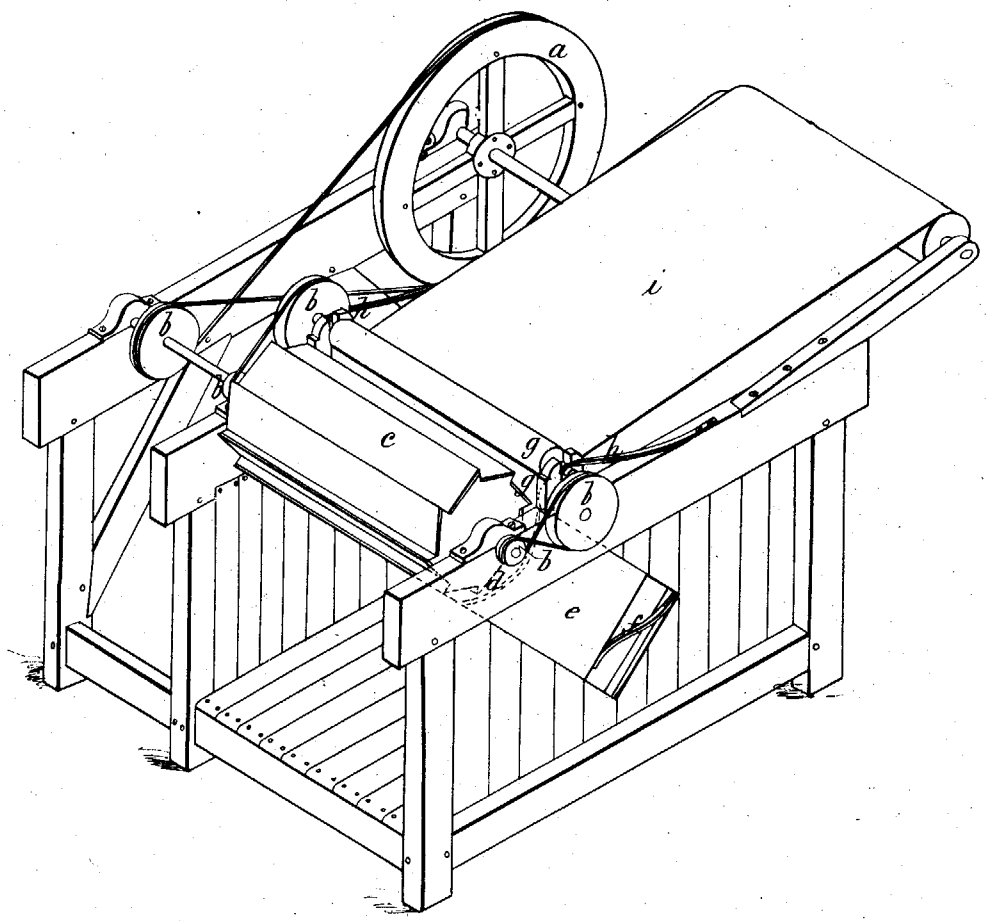
THE NORRIS PETERS CO., PHOTO-LITHO., WASHINGTON, D. C.

Silvanus Leonard of Hampden Maine

Letters Patent

The Schedule referred to in these Letters Patent and making part of the same containing a description in the words of the said Silvanus Leonard himself, of his Improvement in the Thrashing Machine

---

To all to whom these presents shall come: Be it known that I, Silvanus Leonard, of Hampden in the County of Penobscot, and State of Maine, have invented a new and useful improvement in the "Thrashing Machine", and that the following is a full and exact description of the construction and operation of the said machine as Invented or improved by me.

On a frame made of such materials and strength as may be judged sufficient, is to be supported the main wheel giving motion to the rest of the machine, and to be driven by either manual or other power, said wheel is connected with a small pinion on the end of the axis of the beater, which consists of a roller whose surface is formed of angular projections, and may be sheathed with Iron for the purpose of beating out the grain or substance to be thrashed, and working in the concave bed of an inclined graduating slide, so acted on by springs at its extremity as to sink, or yield, should any foreign substance, as stone or wood pass by accident, through the feeding rollers, and come in contact with the beater, thereby avoiding the risk of damage hitherto incurred when these parts are fixtures. The bed of said inclined graduating slide, also to be sheathed with iron; and which slide forms the improvement principally for which I claim, as combined with the form and structure of the beater. The feeding rollers also have a spring acting on their axis, thereby allowing a motion from each other, regulated by said springs. The straw &c is carried on a feeding table through .... rollers presenting it to the action of the beater which at the same time drives said rollers by pulleys connected with each end of its axis. In Witness that the foregoing is a true Specification of my said Invention I have hereunto set my hand, this eighteenth day of March in the year Eighteen Hundred and thirty four Exd. Witnesses W.H. Henry Stone Silvanus Leonard Robt. Clarke Drawing (396 [illegible])

(Patented 27 March 1834)